(12) United States Patent
Kim

(10) Patent No.: US 6,884,123 B2
(45) Date of Patent: Apr. 26, 2005

(54) CONNECTING TERMINAL FOR STORAGE BATTERY

(76) Inventor: Hwan-Chang Kim, San 313-2 (2/2) A-2 Nam-dong, Yongin-shi, Gyoungii-do (KR), 449-030

( * ) Notice: Subject to any disclaimer, the term of this patent is extended or adjusted under 35 U.S.C. 154(b) by 0 days.

(21) Appl. No.: 10/319,990

(22) Filed: Dec. 16, 2002

(65) Prior Publication Data
US 2003/0198867 A1 Oct. 23, 2003

Related U.S. Application Data

(63) Continuation-in-part of application No. 29/169,274, filed on Oct. 15, 2002, now Pat. No. Des. 488,129.

(30) Foreign Application Priority Data
Apr. 23, 2002 (KR) .............................. 20-2002-0012324

(51) Int. Cl.[7] ............................................... H01R 4/28
(52) U.S. Cl. ...................................................... 439/754
(58) Field of Search ................................. 439/754, 758, 439/761, 762, 765, 766, 768

(56) References Cited

U.S. PATENT DOCUMENTS

| 5,302,142 | A | * | 4/1994 | Tabata | 439/762 |
| 5,492,780 | A | * | 2/1996 | Okada | 429/121 |
| 5,595,511 | A | * | 1/1997 | Okada | 439/762 |
| 5,851,129 | A | * | 12/1998 | Matsunaga et al. | 439/764 |
| 6,340,319 | B1 | * | 1/2002 | Matsunaga | 439/761 |

* cited by examiner

Primary Examiner—Thanh-Tam Le
(74) Attorney, Agent, or Firm—Lathrop & Gage LC

(57) ABSTRACT

A connecting terminal for a storage battery is disclosed. The connecting terminal includes a fixation plate having a bolt hole extending therethrough; a fixation member insertable into the bolt hole of said fixation plate; a rounded insertion member extending from said fixation plate and having upper and lower elastic bodies defining an insertion hole, the upper and lower elastic bodies each having flanged portions extending toward one another; and a tightening member extending from said insertion member.

13 Claims, 5 Drawing Sheets

PRIOR ART

CONNECTING TERMINAL FOR STORAGE BATTERY

RELATED APPLICATIONS

This application is a continuation-in-part of U.S. Des. Pat. application No. 29/169,274 filed Oct. 15, 2002, now U.S. Pat. No. D,448,129, which claims priority to Korean Design Application No. 30-2002-2010852, filed Apr. 23, 2002, and this application also claims priority to Korean Utility Application No. 20-2002-0012324, filed Apr. 23, 2002, all of which are expressly incorporated herein by reference.

FIELD OF THE INVENTION

The present invention relates to a connecting terminal for an automobile storage battery, and more particularly to a connecting terminal for a storage battery which can prevent the occurrence of cracks and defective disconnections of said connecting terminal caused by mechanical vibration, and which can minimize deformation by way of changing the construction of the connecting terminal connected to the post terminal of a storage battery.

BACKGROUND OF THE INVENTION

In general, there are several types of connecting terminals for automobile storage batteries, but most of them have a structure of connecting terminals, through which a wire connector is fixed to the post terminal of the storage battery.

For example, a conventional connecting terminal for a storage battery, as illustrated in FIG. 1, is put to use by connecting it to a post terminal 13 of a storage battery 20 by tightening a bolt 11 and a nut 12 at the two sides of the roundly-bent lead connecting terminal 10, and by fixing a wire connector 30 to its one side. This type of connecting terminals for storage batteries has the following problems: A defective connection may readily occur, which involves disconnection of the connecting terminal 10 from the post terminal 13 of said storage battery after some use, or due to mechanical vibration while driving. Since the connecting terminal 20 is made of lead material, which is soft and lacks elasticity, the connection of the connecting terminal 10 naturally loosens during its use and then from time to time needs to be hammered into said connecting terminal 10 for proper connection. In this regard, there are problems of inconvenience, frequent damage to said storage battery 20, and shortening life span.

SUMMARY OF THE INVENTION

In resolving said problems, one objective of the present invention lies in preventing occurrence of cracks even under mechanical vibration to the upper and lower elastic bodies of an insertion hole while at the same time preventing deformation of its shape.

Another objective of the present invention is to extend the life span of a storage battery by improving the connection of its post terminal to said upper and lower elastic bodies of an insertion hole of the insertion member.

Therefore, in one aspect, a connecting terminal for a storage battery is provided, and comprises a fixation plate having an aperture extending therethrough; a fixation member insertable into the aperture of said fixation plate; an insertion member extending from said fixation plate and having upper and lower elastic bodies defining an insertion hole, the upper and lower elastic bodies each having flanged portions extending inward and toward one another; and a tightening member extending from said insertion member.

In another aspect, the tightening member comprises a transversely oriented tightening hole extending therethrough and configured to receive a fastener therein, and a fold portion formed into the tightening member to inhibit deformation thereof when the fastener is adjusted to move the upper and lower elastic bodies of the insertion member relative to one another and thereby adjust the diameter of the insertion hole.

In another aspect, a hollow fixation pipe is provided for regulating the adjustment range for the diameter of the insertion hole defined by the upper and lower elastic bodies while at the same time preventing deformation therein. The hollow fixation pipe may be inserted inside the tightening member over the fastener, which is secured in place for adjusting the diameter of the insertion hole.

DESCRIPTION OF THE PREFERRED EMBODIMENTS

The embodiments of the present invention are described below in further detail with the attached drawings.

Figure 2:
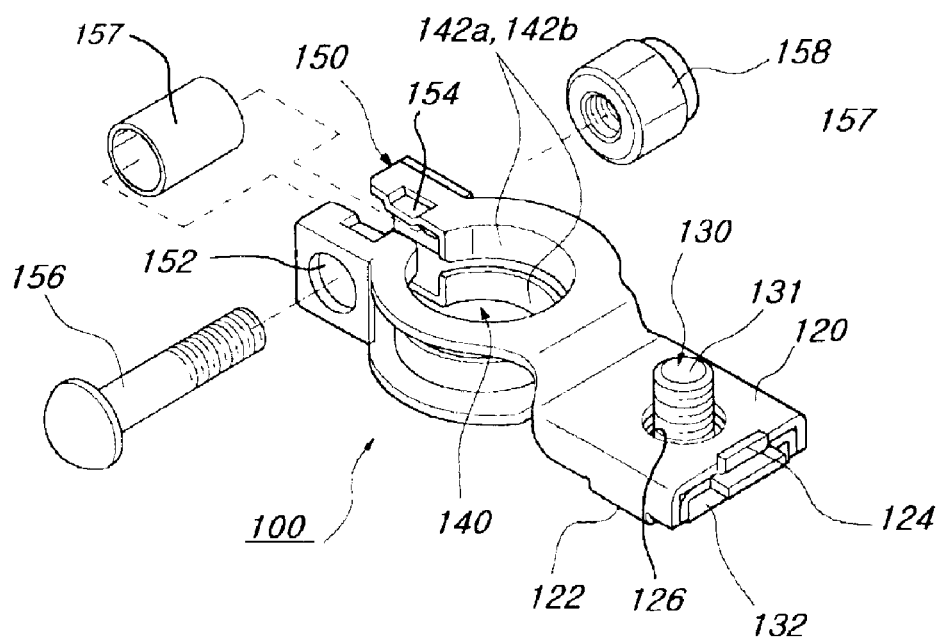
FIG. 2 is an exploded view of the present invention as dissembled, which illustrates the connections of a connecting terminal and a fixation pipe.
Figure 3:
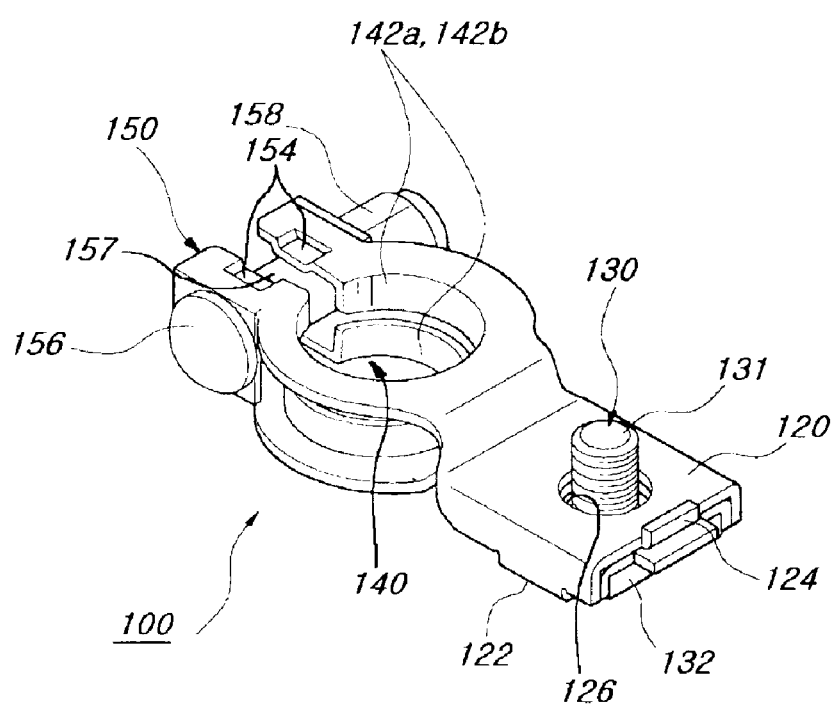
FIG. 3 is a perspective view of the present invention, which illustrates the connections of a connecting terminal and a fixation pipe.
Figure 4:
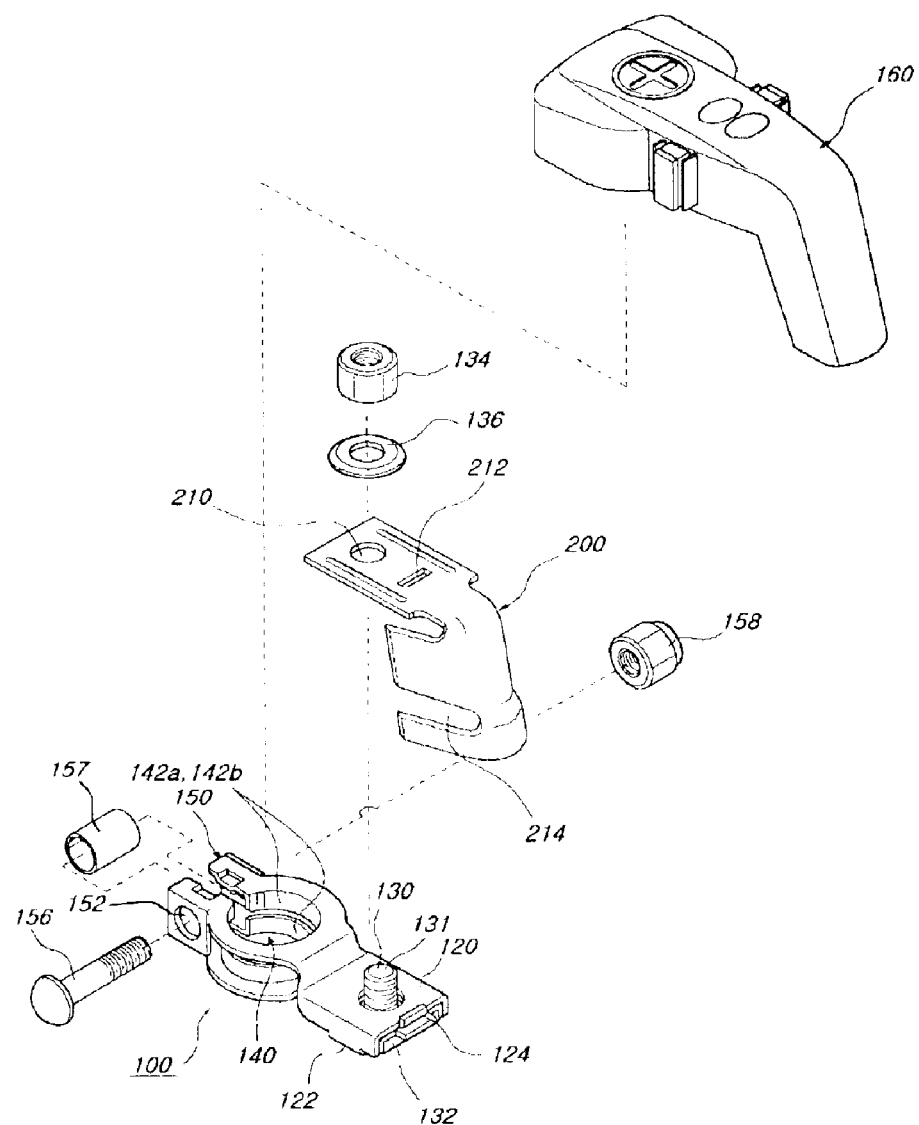
FIG. 4 is an exploded view of the present invention as dissembled, which illustrates the use of a connecting terminal.

FIG. 2 is an exploded view of the present invention as dissembled, which illustrates the connection of a connecting terminal and a fixation pipe. FIG. 3 is a perspective view of the present invention, which illustrates the connection of the connecting terminal and a fixation pipe. FIG. 4 is an exploded view of the present invention as dissembled, which illustrates the use of the connecting terminal.

A connecting terminal 100 for a storage battery according to the present invention is seen in FIGS. 2 and 3, and generally comprises a fixation plate 120 having an aperture, such as a bolt hole 126 of a certain diameter in a center portion of the fixation plate 120; a fixation member 130 installed vertically into the bolt hole 126 of said fixation plate 120 generally in the center thereof; an insertion member 140 on one side of said fixation plate 120; and a tightening member 150 formed to one side of said insertion member 140 and generally having a vertically symmetrical orientation.

The insertion member 140 may have a rounded configuration, and comprises upper and lower elastic bodies (142a, 142b) defining a hole therebetween. The upper and lower elastic bodies (142a, 142b) each have flanged portions bent inward toward one another at the two upper and lower sides to prevent deformation by external pressure or vibration.

The tightening member 150 comprises a fold portion 154, and a tightening hole 152 respectively at the front and rear sides thereof for adjusting the diameter of said upper and lower elastic bodies (142a, 142b) of the insertion member 140 with a fastener, such as a tightening bolt 156 and a tightening nut 158.

The connecting terminal 100 for a storage battery further has a hollow fixation pipe 157, inserted within the tightening member 150 and over the tightening bolt 156. The tightening nut 158 is secured onto the tightening bolt 156 to adjust the diameter of said upper and lower elastic bodies (142a, 142b) of the insertion member 140, wherein said hollow fixation pipe 157 can also adjust the gap between said upper and lower elastic bodies (142a, 142b) and prevent deformation thereof.

The fixation plate 120 has an aperture, such as a bolt hole 126, for receiving a fastener, such as a protrusion for fixation 131 in the form of a bolt. The bolt hole 126 preferably extends through the center portion of the fixation plate 120. The fixation plate 120 also has a fixation plate elastic body 122 which is capable of being bent and extended vertically at a certain length at its front and rear lower ends. Moreover, a protrusion for insertion 124 protrudes upward from the center of one side of the fixation plate 120.

The fixation member 130 comprises a support plate 132, formed horizontally at the lower end of said fixation plate 120, and the protrusion for fixation 131 on said support plate 132. The protrusion for fixation 131 is secured in place by inserting it into the bolt hole 126 formed at the center of said fixation plate 120. Moreover, the support plate 132 is fixed to said fixation plate 120 by bending said fixation plate elastic body 122 formed to the front and rear lower ends of said fixation plate 120, thereby preventing its detachment therefrom.

The fold portion 154, by bending inward at the center of the upper and lower sides of said tightening member 150, inhibits deformation therein. With respect to the fixation pipe 157, extending to a certain length, the diameter of said upper and lower elastic bodies (142a, 142b) of the insertion member are adjusted to the extent of the length of said fixation pipe 157, thereby safely securing in place said upper and lower elastic bodies (142a, 142b) of the insertion member. By this manner, it can prevent deformation from vibrating or shaking.

Figure 5:
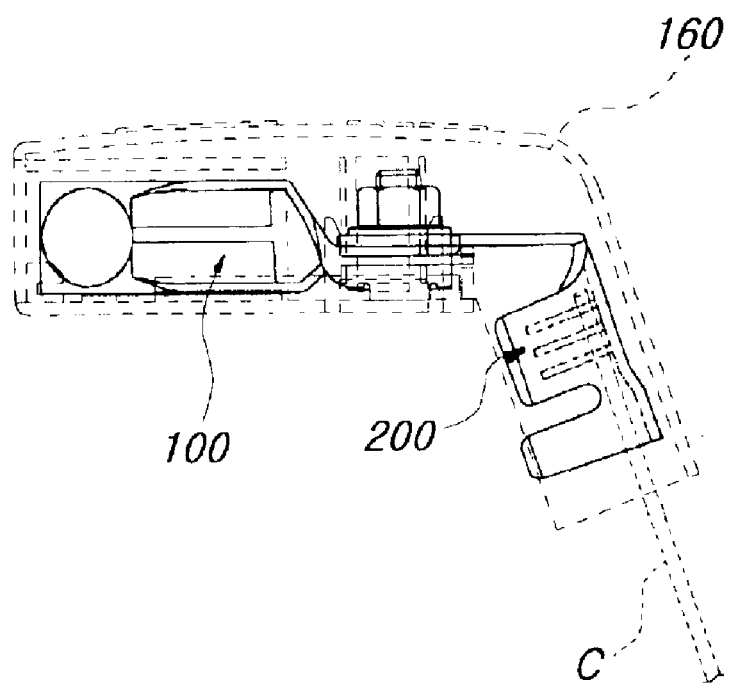
FIG. 5 is a side elevational view of FIG. 4 as assembled.

As seen in FIGS. 4 and 5, the connecting terminal 100 for a storage battery according to the present invention has a connection terminal member 200, connected by serial or parallel means, for supplying electricity inside an automobile from the storage battery. The connection terminal member 200 has an aperture, such as a bolt hole 210 on the flat side for a protrusion for fixation 131, for fixing it to said fixation plate 120 by way of insertion therein. Moreover, to one side of said bolt hole 210 for a protrusion for fixation 131, there is an insertion slit 212 for inserting a protrusion for insertion 124 protruding upward from the end side of said fixation plate 120. Furthermore, there is a locking plate 214, formed with a certain length and extended downward from said insertion slit 212, for securing the wire connector (C) to the inside of said connection terminal member 200.

Figure 1:
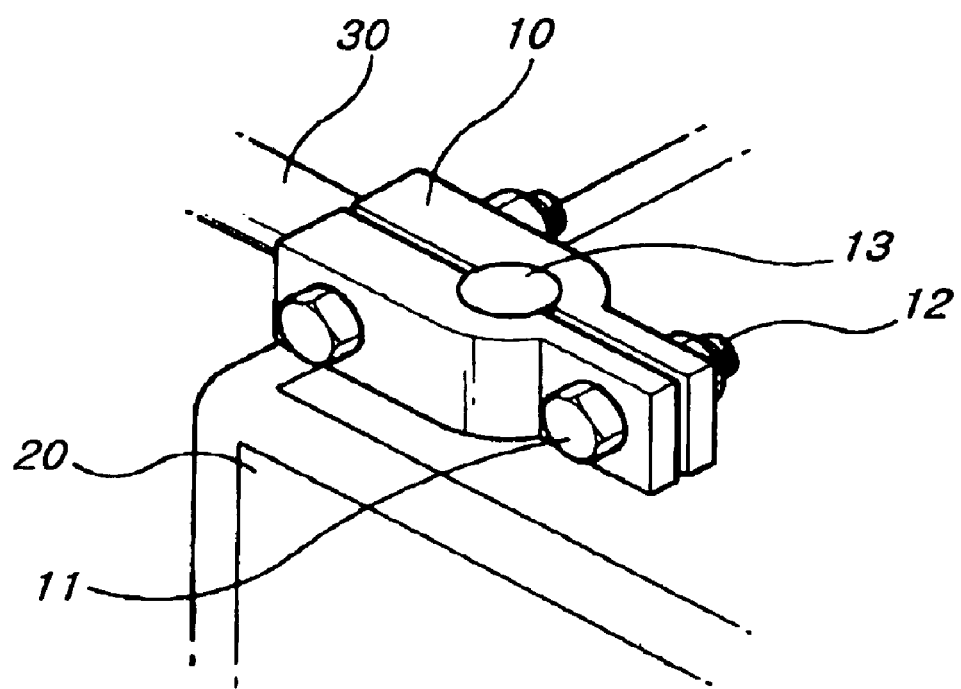
FIG. 1 is a perspective view of a conventional connecting terminal.

In use, the connecting terminal 100 for a storage battery according to the present invention is connected by inserting a post terminal, such as post terminal 13 of FIG. 1, into the upper and lower elastic bodies (142a, 142b) of the insertion hole, which are bent respectively inward at the both sides of upper and lower sides of said insertion member 140. The connecting terminal 100 for a storage battery, equipped with front and rear tightening holes 152 of said tightening member 150 for receiving the tightening bolt 156 and tightening nut 158, is secured in place by adjusting the diameter of the hole formed by the insertion member 140 around the post terminal with the tightening bolt 156 and the tightening nut 158.

The protrusion for fixation 131, fixed to said fixation plate 120 in the form of a bolt through said bolt hole 126, is inserted to the bolt hole 210 formed in said connection terminal 200. A washer 136 may be inserted between said connection terminal member 200 and a nut 134, and said nut 134 is tightened to prevent detachment of said connection terminal 200 from said protrusion for fixation 131.

Moreover, a cover 160 in the shape of an angle, as seen in FIGS. 4 and 5, is used to encase the connecting terminal 100 and connection terminal member 200 for preventing corrosion by sulfuric gas generated from the storage battery.

As described above, the connecting terminal 100 for a storage battery has the effect of preventing shape deformation while at the same time preventing cracks to the upper and lower elastic bodies of the insertion hole even under mechanical vibration. Another effect of the present invention is to extend the life span of a storage battery by improving the connection structure of upper and lower elastic bodies of an insertion hole to the post terminal.

Since certain changes may be made to the present invention without departing from the scope hereof, it is intended that all matter contained in the above description or shown in the accompanying drawings be interpreted as illustrative and not in a limiting sense. It is also to be understood that the following claims are to cover certain generic and specific features described herein.

What is claimed is:

1. A connecting terminal assembly for a storage battery, comprising:
   a fixation plate having an aperture extending therethrough;
   a fixation member having a first portion insertable into the aperture of said fixation plate;
   an insertion member extending from said fixation plate and having upper and lower elastic bodies spaced from one another to define a gap therebetween, the upper and lower elastic bodies defining an insertion hole therein, the upper and lower elastic bodies each having flanged portions extending toward one another; and
   a tightening member extending from said insertion member, said tightening member comprising two opposing body members having a transversely oriented tightening hole extending therethrough and configured to receive a tightening fastener therein, and a fold portion formed into the body members to inhibit deformation of the tightening member when the fastener is adjusted to move the upper and lower elastic bodies of the insertion member relative to one another and thereby adjust the diameter of the insertion hole.

2. The connecting terminal assembly of claim 1, wherein the body members of the tightening member are vertically symmetrical.

3. The connecting terminal assembly of claim 1, wherein the tightening fastener comprises a bolt and a nut configured to be accepted on the bolt.

4. The connecting terminal assembly of claim 1, further comprising a hollow fixation pipe insertable onto the tightening fastener between the body members.

5. The connecting terminal assembly of claim 4, wherein the hollow fixation pipe is configured to adjust the gap between the upper and lower elastic bodies to inhibit deformation thereof.

6. The connecting terminal assembly of claim 1, wherein the flanged portions of the upper and lower elastic bodies are vertically aligned with one another.

7. The connecting terminal assembly of claim 1, wherein the insertion member has a first end and a second end, the insertion member interconnected with the fixation plate at the first end and interconnected with the tightening member at the second end.

8. The connecting terminal assembly of claim 1, wherein the fixation member further comprises a support plate.

9. The connecting terminal assembly of claim 8, wherein the fixation plate further comprises a fixation plate elastic body and an upwardly extending protrusion, the lastic body serving to retain the support plate adjacent to the fixation plate.

10. The connecting terminal assembly of claim 9, further comprising a connection terminal member having an aperture for accepting the first portion of the fixation member and an insertion slit for accepting the upwardly extending protrusion of the fixation plate.

11. The connecting terminal of claim 1, wherein the first portion of the fixation member comprises a fastener.

12. The connecting terminal of claim 1, wherein the upper and lower elastic bodies of the insertion member have a generally ring-like shape with curved outer and inner surfaces.

13. A connecting terminal assembly for a storage battery comprising:

a first portion for connecting the connecting terminal assembly to a connection terminal member;

an insertion member extending from said first portion and having upper and lower elastic bodies spaced from one another to define a gap therebetween, the upper and lower elastic bodies defining an insertion hole therein for accepting a battery post terminal therein, the upper and lower elastic bodies each having flanged portions having a curved profile and extending toward one another; and a tightening member extending from said insertion member and comprising two opposing body members configured to be adjustably spaced apart to move the upper and lower elastic bodies of the insertion member relative to one another and thereby adjust the diameter of the insertion hole, the tightening member further comprising a fold portion formed into the body members to inhibit deformation of the tightening member when the fastener is adjusted to move the upper and lower elastic bodies of the insertion member relative to one another and thereby adjust the diameter of the insertion hole.

* * * * *